United States Patent [19]
Pölzleitner

[11] 3,915,569
[45] Oct. 28, 1975

[54] ORTHO PROJECTOR TO MAKE PHOTO MAPS FROM AERIAL PHOTOGRAPHS

[76] Inventor: Franz Wolfgang Pölzleitner, Hauptstrasse 1495, Au, Switzerland

[22] Filed: Aug. 8, 1972

[21] Appl. No.: 278,771

[52] U.S. Cl. .................................... 355/52; 355/22
[51] Int. Cl.² .................... G03B 27/36; G03B 27/38
[58] Field of Search ............ 354/75, 76; 355/22, 52; 235/151 PL; 33/20 D

[56] References Cited
UNITED STATES PATENTS
3,486,820   12/1969   Blachut................................ 355/22

*Primary Examiner*—John M. Horan
*Attorney, Agent, or Firm*—Flynn & Frishauf

[57] ABSTRACT

An autographic unit scans a model (1) representative of a terrain profile having profile zones, or planes and a displacement measuring device (21, 22) measures coordinate relative movement between one autograph optic and the aerial photo (2) to provide stepped digital position output signals of image coordinates representing line elements, at ground surface. A computer (38) calculates the average image coordinate ($x_{on}$, $y_{on}$) and the difference image coordinate value ($\Delta x_{on}$, $\Delta y_{on}$) which are interpolated and applied to a differential distortion correction calculator (24) to calculate the re-establishment of the image and the required image enlargement and image rotation. A line aperture (9) exposes an ortho photo film (6) in accordance with the image portion, as re-established and modified by the calculated enlargement and rotation, the ortho photo film being moved in accordance with the plane movement of the scanning device of the autographic unit.

18 Claims, 10 Drawing Figures

ORTHO PROJECTOR TO MAKE PHOTO MAPS FROM AERIAL PHOTOGRAPHS

The present invention relates to an ortho projector to make maps from aerial photographs, and more particularly to an ortho projector which can be coupled to a stereoscopic or mechanically analogous utilization apparatus which is provided with a guidance system to scan a model in profiles of uniform distances, in order to transform perspective aerial photographs into exact ortho photo maps, without gaps between adjacent compensating strips to prevent distortion.

A system to represent the position of elements on topographical maps which is used more and more is the photographic ortho projection. It has high information content and is efficient and in these respects is superior to conventional methods of map making. Basically, central projection of the terrain is transferred from aerial photographs into a photographic orthogonal projection of the map.

The transfer of projection is only possible if a photogrammetric utilization apparatus, sometimes termed an autographic unit, or, for short, autograph, generates a horizontal model of the terrain, in space, and to scale, the model being made from at least two overlapping aerial photographs. The model is then mechanically scanned in order to derive the necessary parameters for conversion of the projection.

All known systems utilize a model, in space, which is scanned by the utilization device, usually in predetermined directions Y, perpendicular to a component $b_x$ of the base.

Difficulties have been experienced in reconstitution, particularly if the terrain is highly inclined transverse to the profiles, and particularly roads and other lines appearing on the terrain are apt to be discontinuous or to appear chopped. Additionally, utilization of picture elements from different photographs have the result that noticeable junction lines between the regions taken from different photographs will be apparent to the naked eye, since no two aerial photographs are of exactly equal density, and the human eye is particularly sensitive with respect to differences in overall blackness, or grey content of images.

It has been proposed to provide an electronic device in which a correlator is used to store the shape of the terrain by recording a large number of elevation points, and to then utilize these values in a computer in order to compute an ortho photo image accurate to the order of a thousand, and to display the image in a television-type cathode ray tube. Such apparatus is very expensive and requires complicated and large-scale computer apparatus and can be utilized to make ortho photo maps only if very large numbers of such maps are to be produced.

It is an object of the present invention to provide an ortho photo system in which existing autographic units, operating with essentially mechanical projection, can be readily used, and which system is simple and yet provides results of high quality, that is, well exposed exact ortho photos without gaps between profile strips.

SUBJECT MATTER OF THE PRESENT INVENTION:

Briefly, an ortho projector is provided which includes the usual photogrammetric utilization apparatus in which relative movement between image and the optic of the autographic unit is recorded. The optic of the autographic unit scans the models in profiles by means of a guidance system which provides for right-angle guiding in planes parallel to the image plane and in which the image coordinates are digitally recorded, after a certain and uniform short path has been covered, in the direction of the model profile, the registration being point-by-point. Instead of the usual, previously used analog recorder for the image coordinates, the system includes a digital electronic storage device for the image coordinates. The image coordinates are then applied to a computer in which the average and differences of image coordinates of a model point in adjacent profiles, with the same coordinates in the profile direction, are derived. The average value of the image coordinates, after continuous interpolation, are utilized to move the third image in fine steps by means of stepping motors. The previously utilized and complicated method, of inaccurate reconstruction of the image coordinates by reconstituting the coordinate movements with respect to the model, in intermediate profiles, with an instrument similar to the autographs with a similiarly oriented image, can thus be avoided. The average values of the image coordinates of the autographs, rather, are used directly to control the exposed image which is movable in its plane over a fixed input optic of the ortho projector, by means of servo motors.

The invention will be described by way of example with reference to the accompanying drawings, wherein.

The usual system utilizes as parameter of the projection conversion the component of inclination of the aerial photographs (or of a photograph) as well as the coordinates of the instantaneous profile points with respect to the projection center, of the image under consideration. In actual construction, for direct optical projection, an image element is projected, reversing the exposure step, of the illuminated aerial photograph through an optic within the model space, through a line-shaped diaphragm which is located horizontally and at right angles to the profile directon. The diaphragm is moved along the profile and exposes a film, located immediately therebelow, for short exposure time intervals.

Another system uses small image portions from the light beam path of the autographs which are converted to the ortho photo beam path by optics, located vertically with respect to the image plane in the autograph. A computer computes the necessary enlargement and rotation from the parameters: image inclination and model coordinates (with respect to the projection center), which are necessary for projection in a horizontal plane, by means of zoom lenses and Dove prisms in the beam path. A slit-type diaphragm projects the undistorted image element on the ortho photo film in proper position with respect to the center of the elements.

The above described systems sometimes utilize a third image for the ortho photo production, essentially due to constructional reasons. The third image has the same orientation and is similarly scanned by a third projector similar to the autograph having only a single image. Similar movement in the third projector can be obtained simultaneously with the movement of the autograph, or after recording at a later instant in time.

Figure 1:
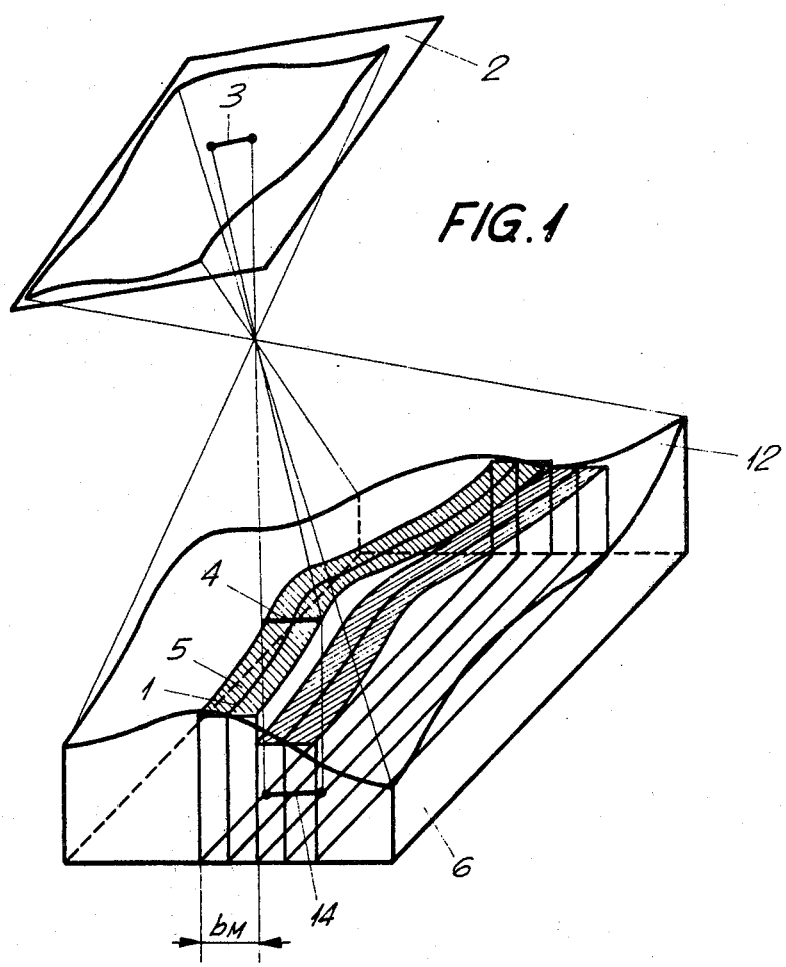
FIG. 1 is a simplified graphic representation of a known projection principle.

Referring now to FIG. 1, it can be seen that projection of a slit-shutter, perpendicular to the profile direction of the film, provides only a rough, inaccurate approximation of orthogonal projection. The actual form of the terrain 12 is not considered, but rather the projection of developed surfaces 5, which have a generatrix 4 and a width $b_M$. The strips are moved along the profile 1 of the terrain horizontally, and perpendicularly to the profile 1. The inclined aerial image is represented by 2, and from which the line element 3 is projected on the generatrix 4 of the surface 5 and will appear as line element 14 in the ortho photo 6, which is generated from the plurality of all line elements 14.

The approximation of the model surface by means of strips of developed surfaces is poor and thus linear, differential distortion results, which must be compensated both with respect to scale, as well as with respect to angle of rotation. If the inclination of the terrain, transverse to the profile, is high, then double images or gaps may arise between adjacent profiles which are particularly undesirable in ortho photos, especially if road lines or other profile lines are present, which will appear chopped.

Figure 2:
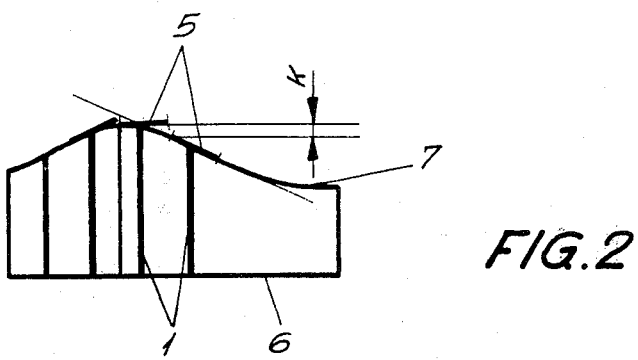
FIG. 2 is a transverse cross section perpendicular to the direction of profile through the model, and the projection surfaces in the used projection.

It has been proposed to remove these disadvantages by determining the transverse inclination by the difference in level or height between the profile under consideration and the previous profile scanned, and to determine the profile difference. This difference is then considered in the computation during compensation for distortion of the line elements. Analog computers were used which were set to operate with rather rough approximating formulae. As the nadir of the image is moved farther and farther away, the errors increase so that both aerial photographs had to be utilized for the ortho photo production, in order to keep the nadir distance small. Utilizing image elements from different images, however, is disadvantageous due to the high sensitivity of the human eye to differences in black-content and the resulting sharp line between adjacent regions, which is usually apparent. Comparing a present profile with a previous profile does not accurately record changes in transverse inclination, so that, as can be seen in FIG. 2, gaps K will be apparent on the projected surfaces 6, as can readily be seen by a section 7 through the terrain perpendicular to the profiles 1.

Figure 3:
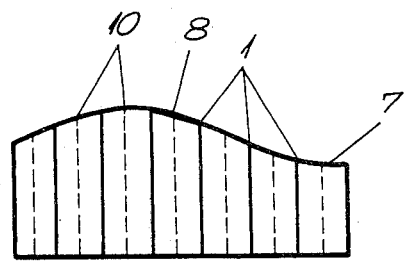
FIG. 3 is a section perpendicular to the profile direction through the model, and the projection surfaces in a utilized projection.
Figure 4:
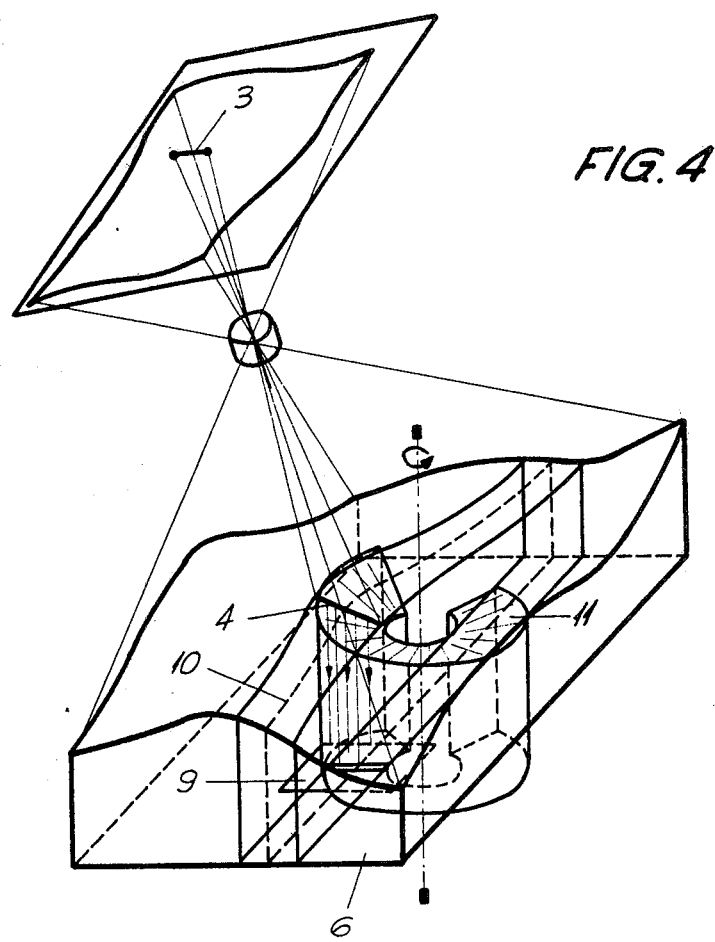
FIG. 4 is a schematic representation of a known ortho projection device, utilizing the projection system of FIG. 3.

Let the course of the areas, in transverse profile 7 (FIG. 3) be linear between the profiles 1. If the projection strips, as inclined surfaces are to match smoothly with respect to each other, when the projecting strips are stretched so that the generatrix 8 thereof will be in vertical planes parallel to the profile planes, then the differences in level of the points in adjacent profiles, but having the same coordinate (in profile direction) must be known. Further, as in a known apparatus, a third projector must be moved in profiles which form the arithmetic mean of each two adjacent profiles. Referring to FIG. 4, ortho projection is obtained by reversal of the exposure step, so that the exposed image elements 3 are projected by an optical system into a modelling space. The image element is accepted on a glass fiber spiral, or ramp 11, having a variable inclination of the ramp, which is adjusted corresponding to the profile inclination. The fibers in the glass fiber ramp are arranged vertically and conduct the projected image element 4 on a slit diaphragm 19 which is located therebelow, horizontally, in order to permit exposure of the ortho photo film upon movement of the slit diaphragm. The glass fiber ramp 11 and diaphragm 9, as well as the ortho photo film 6 therebeneath are guided by means of height or level adjustment along the intermediate profiles 10.

The system of FIG. 4 results in theoretically useful maps; it requires, however, high use of material and, due to the optical characteristics of the glass fiber ramp, permits accurate distortion compensation only up to a transverse inclination of about 30 degrees. This system additionally has the disadvantage that the graphic reproduction, that is, the storage of the autograph profile occurs in a highly reduced scale, resulting in rather large inaccuracies upon interpolation of the intermediate profile, and the determination of the transverse inclination. For ortho projection, an apparatus is used which corresponds to an autograph without a second chamber, that is, a device to receive, or record an aerial photograph. In this apparatus, only a single aerial photograph with the same orientation (for example primary inclination $\phi$; secondary inclination $\omega$; tipping $\eta$) is used. The orientation elements are read on the autograph and are newly set into the projector. As all transfers of values, or changes of scales, this operation has errors which decrease the accuracy of the ortho photo maps and which require careful, time consuming and meticulous, error-free adjustment. To obtain accurately uniform exposure of the ortho photos, an exposure control is necessary which changes the exposure in dependence on the position and height within the model, the image inclination, and the transparency of the glass fiber ramp, which is a function of ramp inclination.

Scanning of the model of the terrain in profiles can be accomplished by an electronic correlator, which replaces the operator on the autograph. Electronic devices which electronically calculate the shape of the terrain require large-scale data processing apparatus which is frequently unavailable.

Figure 5:
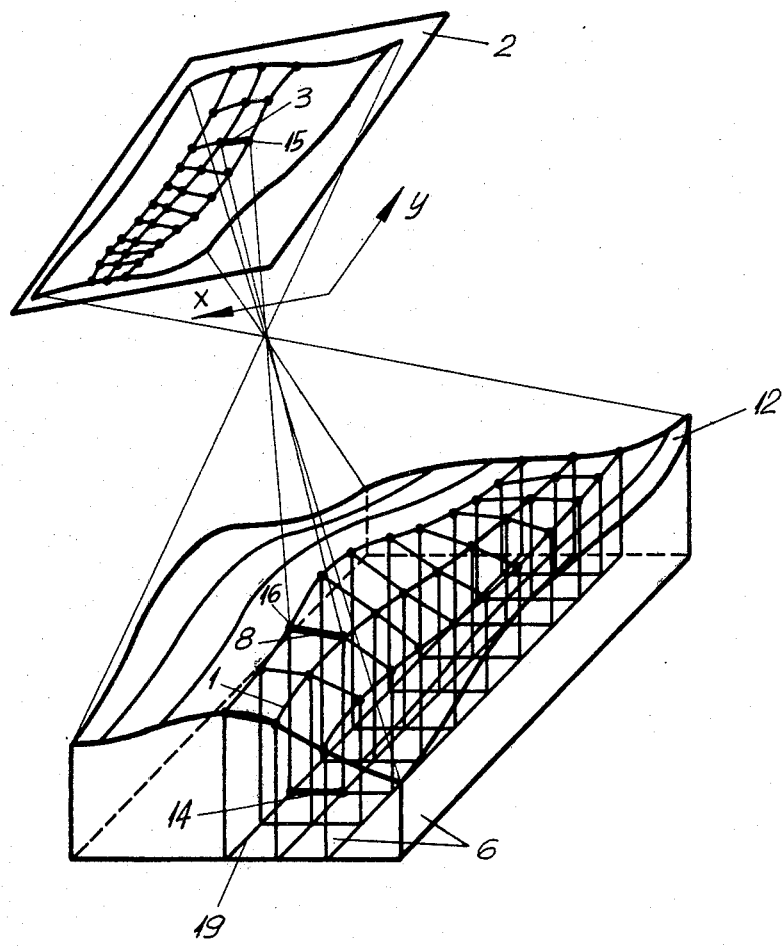
FIG. 5 illustrates the relationship, in principle, between central perspective of an aerial photograph and orthogonal projection of an ortho photo map, in accordance with the projection of FIG. 3.
Figure 6A:
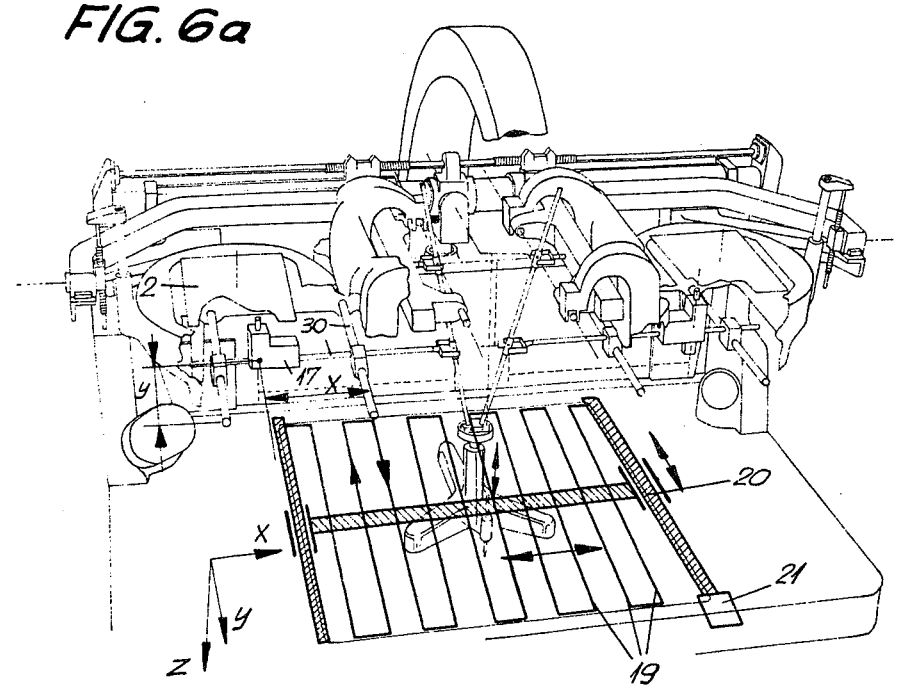
FIGS. 6a and 6b illustrate, in heavy lines, perspective views of the additional equipment to be used with existing autographs which are required to control the ortho projector in accordance with the present invention.
Figure 6B:
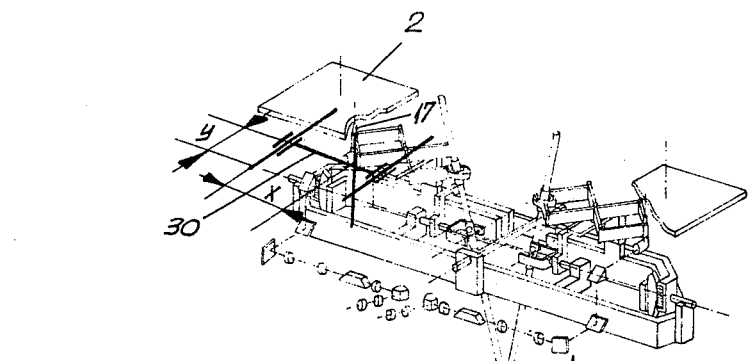
Figure 6B:
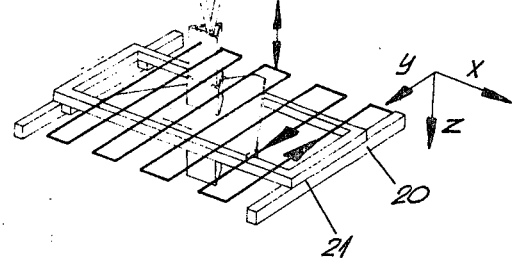

The theoretical basis of the present invention can best be understood in connection with FIG. 5, in which the principal interrelationships between central perspectives from an aerial photograph 2 and the orthogonal projection 6 of a map, or an ortho photo are illustrated. A pair of partially overlapping aerial images 2 are utilized to provide an optical model of the terrain 12 in an autograph, which is scanned by an operator manually, or automatically by a correlator, in profiles 1. To this end, the scanning device is provided with a mechanical guidance apparatus which is moved along similar steps - in plan view - and along straight lines 19. A line element of the ortho photo 14 then is derived from the vertical projection of the line element 8 in the terrain, which can also be considered as a generatrix of the vertical surface perpendicular to the profile plane of an inclined projection surface between a pair of terrain profiles 1. These terrain or contour lines are imaged in the aerial image 2 as the lines 3, as can be determined from a connection of the image point 15 with the coordinates $x, y$, from the model point 16 of adjacent profiles 1 of the same coordinate in the profile direction - usually the Y-direction in the autograph. The entire projection system thus images the line element 3 of the aerial image, changed in scale and rotated, on the ortho photo film, to form the image in the position and size of the line element 14. The sum of the continuously adjacently placed line elements 14 then provides the ortho photo 6. FIGS. 6a, 6b illustrate, schematically, the additional accessories necessary with an autograph of existing construction in order to be able to record the coordinates of the image points $x, y$, upon scanning of the profile of the model, in constant Y-intervals.

The relative movement of the visualization optics 17, vertically to the image 2 must be provided to form an orthogonal guiding system 30. Such a guidance system must be added by way of accessory - if not already available in the autograph - to permit right-angle digital recording of image coordinates $x, y$. To scan the model in profiles, the model scanning device of the autograph is guided in profile direction along uniformly spaced lines 19. The height of the profile is constantly corrected by means of an electronic correlator or a utilization device. After uniformly similar paths in the profile direction have been covered, a measuring device 21 records the instantaneous image coordinates.

Figure 7:
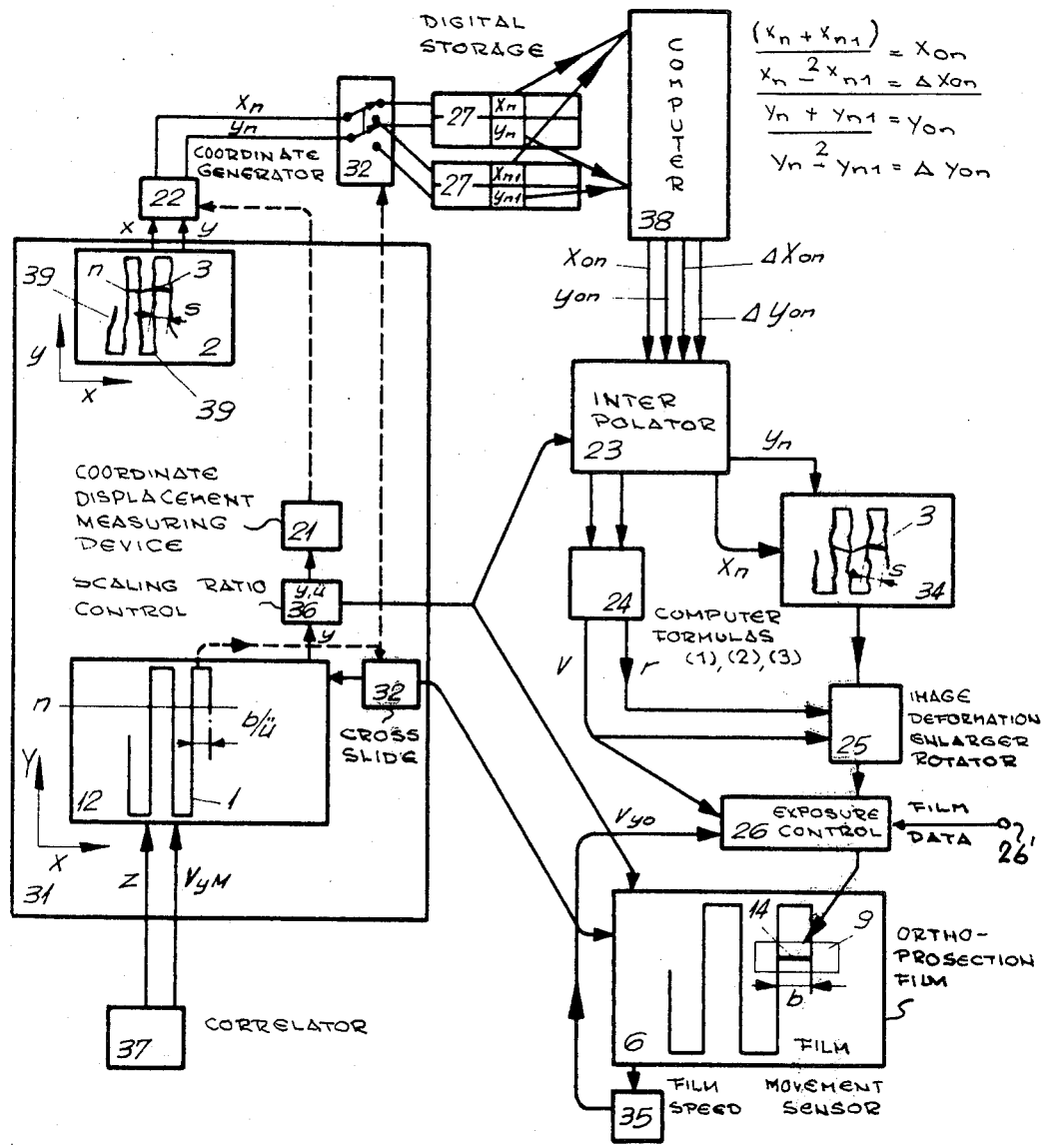
FIG. 7 is a block diagram of the ortho photo system for on-line operation.

The system is so arranged that the ortho photo device can be applied from an autograph in on-line operation or from various autographs in off-line operation, as illustrated in FIG. 7 in which the cooperation between the elements of the ortho photo system in on-line operation is shown.

An operator, or an electronic correlator 37 (FIG. 7) controls scanning of the optical model 12 of the autograph 31 by height adjustment of the scanning device to predetermined profile planes, in accordance with terrain profile 1. The feed device 32 sets the distances between the terrain profiles 1 to be always of a predetermined amount. Depending on the complexity of the form of the terrain, scanning speed can be changed continuously. Movement of the scanning device, in accordance with the terrain profiles, in image 2 corresponds to movement of the measuring datum or mark 39 (FIG. 7) of the optics of the autograph. This movement can be considered as relative movement between the vertical scanning or imaging optics with respect to the image. Upon scanning of the profile, the image coordinates $x, y$ provide output values after uniformly sub-divided paths of the horizontal projection of the profile have been covered, by a path length measuring device 21. The image coordinates $x, y$ are obtained in digital form by means of transducers, or coordinate generators 22 from the displacement or path length measuring device 21, and the digital values are stored in a digital storage device 27, storage device 27 storing the instantaneous position, in profile. When the next profile is being scanned, similar steps are employed, with this difference, however, that the image coordinates are stored in a similar, but second storage device 27', the path transfer of the storage being effected by the transfer switch 32 which changes back and forth between consecutive scannings. The stored digital positions are read into a computer 38, where the digital position in one storage device 27 (or 27') is compared with the digital position of the previously scanned values, and from the old and new coordinates both an average and a difference are calculated as follows:

$$\frac{x_n + x_{n-1}}{2} = x_{on} \quad \frac{y_n + y_{n-1}}{2} = y_{on}$$

The averages $x_{on}$ and $y_{on}$ between the coordinate data of the scanning profile under consideration, and the next preceding profile position controls movement of the third, illuminated image 34 in front of the input optic of the ortho photo beam path, movement being with the same orientation with respect to the orthogonal guiding system as in the autograph. This movement is controlled by the averages after linear interpolation in an interpolator 23 under control of the autograph 31, or from the ortho photo film 6. The interpolation controlled by the path is utilized in order to permit scanning of the profile with variable speed. The coordinate differences $$\Delta x_{on} = x_n - x_{n-1} \text{ and } \Delta y_{on} = y_n - y_{n-1}$$

are interpolated similar to interpolation of the average of the coordinates in interpolator 23.

A subsequent computer 24, which may operate digitally or by analog principle, permits continuous calculation of enlargement and rotation in order to compensate for differential distortion, calculating as follows:

$$\tan r = \frac{\Delta y_{n, n-1}}{\Delta x_{n, n-1}} \quad (1)$$

from which the necessary rotation $r$ can be determined; and $$S = \sqrt{\Delta y^2_{n, n-1} + \Delta x^2_{n, n-1}} \ldots (2)$$

from which first the length S of the line element 3 in the aerial image can be caluated and further $$v = \frac{b}{S} \quad (3)$$

from which the enlargement $v$ can be calculated, which is necessary in order to bring the line element 3 in the aerial image 2 to the length $b$ of the line element 19 in the ortho photo 6.

The portion of the image received from the input optics of the ortho photo beam is enlarged and rotated in an image deformation enlarger and rotator unit 25, by optical enlargement either by a zoom system, or rotation by a Dove prism, or transferred into a television-type image which can be electronically enlarged and rotated. The line element 14 is projected on the ortho photo film 6 through aperture 9. In both instances, image deformation 25 is controlled by the differential deformation compensating computer 24.

Due to change in the ortho photo speed, and changes in enlargement, the exposure intensity must be controlled continuously, which is carried out by an exposure control device 26. A film movement speed sensor 35 is provided for the movement of the ortho photo film. Additional characteristics which can be fed into the exposure control 25 are derived from a terminal 26' which provides signals representative of film data, such as image density, film sensitivity, filters (and their filter factors), width of the aperture (dimension of the aperture in the profile direction), lamp aging, and the like, as well as a base setting for exposure control can be supplied.

The line-like aperture 9 projects on the ortho photo film the differentially corrected and undistorted image portion of the line element 14, which corresponds to the line element 3 of the aerial photograph or image.

The ortho photo film 6 is moved proportionally and synchronously to the flat, plane components of the scanning movement in the autograph, beneath the aperture. The proportionality is desirable, since the ortho photo frequently may be in a different scale than the model in the autograph.

A mechanical transmission 36, which provides a predetermined transmission ratio functions as a scaling ratio control and has a transfer ratio $\mu$ = ortho photo/model in order to compensate for the difference between the scale of the model and the scale of the ortho photograph. The plane scanning movement is thus transferred by the ratio $\mu$ determined by the scaling ratio control 36, either directly mechanically, or by means of electrical scaling, synchronous to the movement of the ortho photo film 6. The width of the aperture to which the distance of the profile or contour lines in the ortho photo corresponds should not be influenced by the scaling ratio between the model of the autograph and the ortho photo, since otherwise too many widths of apertures would be necessary. Thus, the profile distance is changed in the autograph in the ratio of the ortho photo size to the size of the model, that is, in the scale, by means of the device 31.

The image coordinates are sensed, point by point. These coordinates are provided for the ortho photo and it is therefore desirable that the intervals of the paths in the triggering device 21, that is the displacement measuring device, provides, in the final ortho photo, an average rounded off value. The movement in the vertical film projection in the autograph therefore is mechanically scaled in scaling ratio controls 36 and transferred to the measuring device 21.

The end product of the system then is a film which is representative of the unity of the line elements, fitting against each other without gaps, that is, an ortho photo having a homogeneous scale. A summary of the preferred elements, their operation, and operative relationship is set forth in claim 13.

Figure 8:
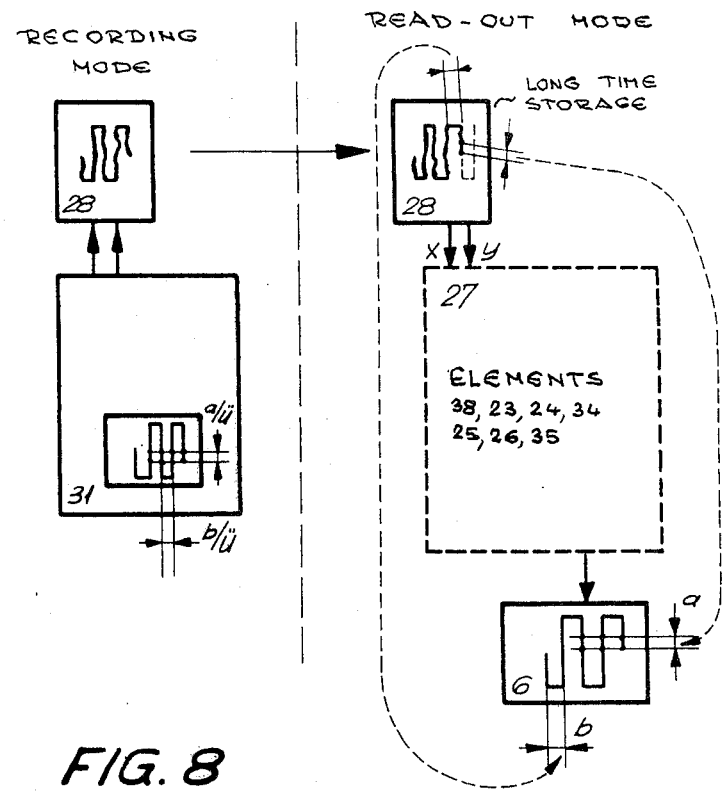
FIG. 8 is a fragmentary block diagram of the ortho photo system of FIG. 7 and illustrating the modification for off-line operation.

The functional cooperation of the elements in offline operation is illustrated in FIG. 8 which, in general principle, is similar to the system of FIG. 7. The difference, only, is shown in FIG. 8 and will be described. The image coordinates are applied from the autograph 31 not directly into the digital store 27, 27', respectively, but rather are first read on a long-term magnetic tape storage element 28, or on any other long-term storage device, in digital representation. When the ortho photo is later made, the recorded information is again reproduced and read into the storage device 27 as in the on-line system, previously described, for further processing.

In FIG. 8 it is necessary not only that the image coordinates are known, but additionally the path $a$ between recording of the image coordinates, and the profile distance $b$ in the ortho photo must be determined. The ortho photo film, between projection of a pair of sequentially registered image points, is moved continuously by the amount $a$. Upon change to the next following profile, the ortho photo film is shifted vertically by the distance $b$. One of the specific advantages of this system is that one or more autographs can provide an ortho photo in a single ortho photo unit in shorter time than required for complete model scanning.

Figure 9:
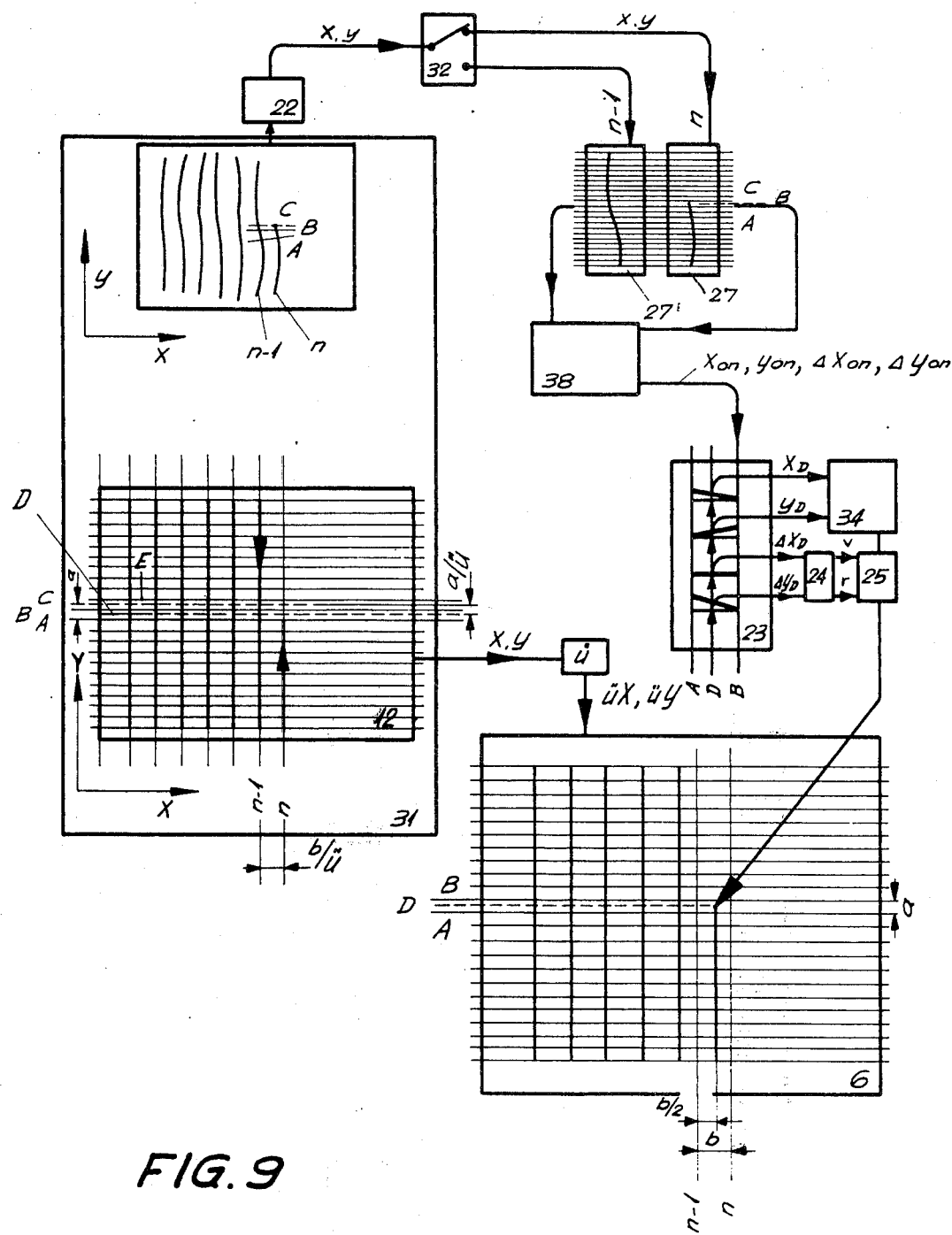
FIG. 9 is a highly schematic graph of the operating position of the elements in the ortho photo system at one instant during on-line operation.

FIG. 9 illustrates the sequence of the various operations, and shows the working position when operating in the on-line mode. The reference numbers correspond to those of FIG. 7.

The autograph 31 scans the profile in the model space 12. First scanning is a scanning step denoted as n—1; the next one as scanning step n. The image coordinates $x$, $y$ are recorded in unit 22 corresponding to the positions $A_n$ and $B_n$, the horizontal distance in the model being $a/\mu$ where $\mu$ corresponds to the transfer or scaling ratio of element 36. The coordinates are read into the register 27 and the data derived from register 27 and register 27' (which has the n—1 coordinates therein) corresponding to points $A_{n-1}$ and $B_{n-1}$, to obtain the values $x_{on}$, $y_{on}$, $\Delta x_{on}$, $\Delta y_{on}$, are then transferred to the interpolator 23.

The interpolator and the ortho photo film are now located proportional to the interval a (or, rather, $a/\mu$) at the same point D between A and B as the autograph in the interval B/C at the point E. Control is by movement of the autograph in the model room 12. This means that the interpolator and the ortho photo film lag behind the autograph by one recording interval. This is necessary in order to have a pair of reference points for the interpolation in interpolator 23.

In off-line operation (FIG. 8) the only difference is that the ortho photo film can be moved with any desired speed. Further, the fixed steps, or path intervals of the autograph, upon scanning of the model, are recorded upon recording the image coordinates. The data are then read from magnetic tape, or similar storage media into the store 27, 27', and the interpolator is controlled by the paths or steps taken by the ortho photo.

The digital storage devices 27, 27' preferably are digital shift registers having their inputs and outputs connected to computer 38. Broadly, the digital storage devices 27, 27' can be considered a single digital storage means having separate addresses for values representative of coordinates of a given scanning step and of the preceding scanning step, related to a predetermined position of the profile, as explained in connection with FIG. 9.

The third image 34 has an orienting device associated therewith in order to orient the third image to be identical to the orientation of the aerial photo 2 in the autograph 31. It is furthermore provided with an orthogonal guiding system, with servo control, so that the third image will move in synchronism with the scanning of the aerial photo 2 in the autograph.

The present invention has been described specifically in connection with scanning along orthogonal coordinates; other coordinate systems for scanning, such as polar coordinates, may be used. Timing and clock signals, necessary for control of the various steps have been omitted from the discussion, since their use will be obvious and likewise clock sources and the like have not been shown in the drawings.

Various changes and modifications may be made within the scope of the inventive concept.

I claim:

1. Ortho projector and stereoscopic and mechanically analogously operating scanning apparatus including an autographic unit, having a scanning device with a guidance system scanning a model (12), representing a terrain profile and having profile zones, forming a first image (1), scanning being in accordance with a predetermined raster in uniform profile zones to convert perspective overlapping aerial photos (2,34) into orthographic maps comprising a guidance system (30) located and movable parallel to one of the aerial photos (2), forming a second image, in accordance with predetermined coordinates;

a displacement measuring device (21, 22) measuring relative movement between the optics of the autographic unit and the aerial photo and providing digital output signals in accordance with uniform, predetermined displacement distances upon scanning;

digital storing means (27) receiving and storing said step output signals at least until subsequent step output signals are received;

computer means (38) connected to and receiving the step output signals of a given step (n) and of the preceding step (n−1), the computer means calculating the average image coordinate value ($x_{on}$, $y_{on}$) and the difference image coordinate value ($\Delta x_{on}$, $\Delta y_{on}$);

an interpolator (23) receiving the output from the computer means (38) and the stored values obtained for the adjacent position during prior scanning of the profile;

means moving the other (34) of the aerial photos, and forming a third image (3), over the orthographic optic under control of the output from the interpolator;

a differential distortion correction calculator (24) having the coordinate differences continuously applied thereto to calculate the re-establishment of the image and the required image enlargement and image rotation;

means (25) receiving an image portion (3) from the third image and having the output of the calculated image enlargement and rotation applied thereto;

and a line aperture (9) exposing the ortho photo film (6) in accordance with the image portion, as re-established and modified by the calculated enlargement and rotation, the ortho photo film being moved in accordance with the plane movement of the scanning device of the autographic unit.

2. Apparatus according to claim 1, wherein the optic of the autographic unit is positioned perpendicularly with respect to the aerial photo.

3. Apparatus according to claim 1, wherein the predetermined coordinates are an orthogonal coordinate system.

4. Apparatus according to claim 1, wherein the digital storage means comprises a digital shift register having its inputs and outputs connected to the computer means.

5. Apparatus according to claim 1, wherein the third image (34) is pre-oriented similar to the aerial photo (2) in the autographic unit (31) so that it will have the same predetermined coordinates as the aerial photo, and said third image is moved in coordinate directions similar to the scanning by the guidance system in the predetermined raster.

6. Apparatus according to claim 1, including (FIG. 8) storage means (28) to store the image coordinates, said storage means being connected to the digital storage means (27) for subsequent reconstitution of the ortho photo.

7. Apparatus according to claim 1, including exposure control means (26) controlling exposure through the line aperture (9) to ensure uniform exposure of the ortho photo film (6).

8. Apparatus according to claim 7, including means (26') controlling the exposure control means in accordance with speed of movement of the film, film characteristics, and enlargement factors.

9. Apparatus acccording to claim 1, wherein the displacement measuring device includes coordinate generator means (22) to calculate the image coordinates; and the computer means (38), the interpolator means (23) and the differential distortion correction and image calculator (24) comprise apparatus independent from the autographic unit (31) and controlling the ortho projector.

10. Apparatus according to claim 1, comprising switch-over means (32) switching the data from the displacement measuring device to predetermined addresses (27, 27') of the digital storage means, the addresses being associated with predetermined positions of the profile of the model.

11. Apparatus according to claim 1, wherein the computer means computes the average image coordinates and the difference image coordinates in accordance with the following relationships:

$$x_{on} = \frac{x_n + x_{n-1}}{2}, \quad y_{on} = \frac{y_n + y_{n-1}}{2}$$

12. Apparatus according to claim 1, wherein the differential distortion correction calculator (24) carries out the calculations in accordance with the following relationships:

$$\tan r = \frac{\Delta y_{n,\,n-1}}{\Delta x_{n,\,n-1}}, \quad v = \frac{b}{S}$$

wherein r is the required rotation, v is the required enlargement, b is the length of a line element of the ortho photo (6), and S is determined by the following relationship:

$$S = \sqrt{\Delta y^2_{n,\,n-1} + \Delta x^2_{n,\,n-1}}$$

13. Apparatus for the transformation of perspective aerial photographs into accurate ortho photographs without gaps or double images, comprising a digital store (27) for storing sequentially the rectangular image-coordinates ($x_n, y_n; x_{n1}, y_{n1}$) of points in one of the aerial photographs (2) of the ground which correspond to points at equal intervals of horizontal distance along profiles which are the intersections of the surface of the ground, or of a true-to-scale model (12) of the the surface of the ground, and vertical planes which are parallel and at a uniform horizontal distance from one another; a first electronic computer (38) for receiving as input the image coordinates from the digital store (27) and computing the means and differences of image-coordinates of points which lie at the ends of linear image elements which correspond to line elements (3) on the surface of the ground or its model and which are uniformly spaced in horizontal distance along each profile and extend the shortest possible distance to the neighbouring profile; an interpolator (23) for receiving as one input $x_{on}, y_{on}$) the means and differences of image coordinates of the end points of successive computed linear image elements from the first computer and as a second input $\Delta x_{on}, \Delta y_{on}$) electrical signals at constant increments of horizontal distance along the profiles, these increments being smaller than the horizontal distance between the successive line elements on the surface of the ground or its model, for performing at each such electrical signal an interpolation between successive computed linear image elements, and for providing as one output ($x_n, y_n$) the image-coordinates of the middle points of interpolated linear elements and as a second output differences of image coordinates of the end points of interpolated linear image elements; a second electronic computer (24) for receiving as input said second output from the interpolator and computing the angle of rotation ($r$) and change of scale ($v$) of each interpolated linear image element which are required in order to bring them all into a common uniform scale and orientation in the horizontal plane and perpendicular to the orthogonal projection of the profiles in the horizontal plane, the uniform scale being that of the required ortho photo; a servo system driven picture carrier (34) for having mounted therein the aerial photograph (3) whose image coordinates have been determined, or a copy of this photograph, and for receiving as input said one output ($x_n, y_n$) from the interpolator (23) past an optical system which continuously collects a small area of the photographic image for subsequent processing, the centre of each such small area being the interpolated middle point of the linear image element (3) from the interpolator; an imagedeformation and projection unit (25) for receiving as one input the image collected by the optical system and as a second input electrical signals, which represent the computed angle of rotation ($r$) and change of scale ($v$), from the second computer (24), and for rotating and changing the scale of the collected image in accordance with the computed values, and for projecting a part of the so-deformed image orthogonally onto a moving photographic film (6) on which the ortho photo is to be produced; an exposure regulator (26) for varying the brightness of the image from the image-deformation unit in response to electrical signals which represent first (26') an average setting for the particular conditions pertaining in the production of an ortho photo - such as the particular aerial photograph and the sensitivity of the ortho photo film emulsion - second the speed of motion (35) of the ortho photo film (6) relative to the image being projected onto the film through an aperture, and third the change of scale (36) in the image-deformation unit, so that the exposure of all parts of the ortho photo is both constant and proper for the type of film; an aperture (9) in the form of a replaceable elongated slit whose length is equal to the perpendicular distance in the horizontal plane between the profiles, in the scale of the ortho photo, and is oriented in this perpendicular direction and lies in the optical path from the exposure regulator (26) and close to the ortho photo film, so that only the rays passing through the slit reach the ortho photo film and hence a continuous series of line elements (14) from the image transmitted by the exposure regulator is exposed in the ortho photo film (6); a carrier (FIGS. 6a, 6b) for moving the ortho photo film in a scanning direction perpendicular to the line elements and so coordinated by an electrical servoloop (30) with the motion of the aerial photograph that a line element in the ortho photo always corresponds to its associated projectively transformed linear image element in the aerial photograph and therefore represents the orthogonal projection onto the horizontal plane, at the ortho photo scale, of a line element on the surface of the ground which is perpendicular to the profiles and extends the shortest possible distance between profiles, the scanning motion being performed, in use, in alternate directions with automatic steps between scans, these steps being in the direction perpendicular to the profiles and of length equal to the length of the slit, so that the sum of all exposed line elements comprises a photograph of the ground at constant scale, with orthogonal projection onto the horizontal plane, and free from the effects of linear ground slope in the direction perpendicular to the profiles; and a speed sensor (35) for sensing any variation of the speed of the scan motion of the ortho photo film and providing said second signal to the exposure regulator (26).

14. Apparatus as claimed in claim 13, wherein the digital storage means (27) comprises a digital shaft register having its inputs and outputs connected to said first computer.

15. Apparatus as claimed in claim 13, wherein the second aerial photograph (3) is provided with an orientation device so that it has the same orientation relative to its guidance and coordinate system as the first photograph (2) has relative to its coordinate system when the image coordinates are measured.

16. Apparatus as claimed in claim 13, wherein (FIG. 8) external storage means (28) are provided for the storage of image coordinates in off-line usage, said external storage means being connected to the digital store (27) for the later production of ortho photographs.

17. Apparatus as claimed in claim 13, wherein said first electronic computer (38) takes as primary input any quantities from which rectangular image coordinates can be computed, and transforms these data into such rectangular, two-dimensional image coordinates for further processing in the ortho photo apparatus.

18. Apparatus as claimed in claim 13, wherein switching means (32) are provided which are operated at the ends of profiles so that image coordinates of neighbouring profiles are stored in separate halves of the digital store (27).

* * * * *